(12) United States Patent
Glasco et al.

(10) Patent No.: US 8,627,041 B2
(45) Date of Patent: Jan. 7, 2014

(54) EFFICIENT LINE AND PAGE ORGANIZATION FOR COMPRESSION STATUS BIT CACHING

(75) Inventors: David B. Glasco, Austin, TX (US); Peter B. Holmqvist, Cary, NC (US); George R. Lynch, Raleigh, NC (US); Patrick R. Marchand, Apex, NC (US); Karan Mehra, Cary, NC (US); James Roberts, Austin, TX (US); Cass W. Everitt, Heath, TX (US); Steven E. Molnar, Chapel Hill, NC (US)

(73) Assignee: Nvidia Corporation, Santa Clara, CA (US)

( * ) Notice: Subject to any disclaimer, the term of this patent is extended or adjusted under 35 U.S.C. 154(b) by 601 days.

(21) Appl. No.: 12/901,452

(22) Filed: Oct. 8, 2010

(65) Prior Publication Data

US 2011/0087840 A1 Apr. 14, 2011

Related U.S. Application Data

(60) Provisional application No. 61/250,431, filed on Oct. 9, 2009.

(51) Int. Cl.
*G06F 12/00* (2006.01)
*G06F 13/00* (2006.01)

(52) U.S. Cl.
USPC ........... 711/208; 711/100; 711/114; 711/118; 711/141; 711/154; 711/200; 711/206

(58) Field of Classification Search
USPC ......... 711/114, 118, 141, 154, 206, 100, 208, 711/200
See application file for complete search history.

*Primary Examiner* — Midys Rojas
(74) *Attorney, Agent, or Firm* — Patterson & Sheridan, L.L.P.

(57) ABSTRACT

One embodiment of the present invention sets forth a technique for performing a memory access request to compressed data within a virtually mapped memory system comprising an arbitrary number of partitions. A virtual address is mapped to a linear physical address, specified by a page table entry (PTE). The PTE is configured to store compression attributes, which are used to locate compression status for a corresponding physical memory page within a compression status bit cache. The compression status bit cache operates in conjunction with a compression status bit backing store. If compression status is available from the compression status bit cache, then the memory access request proceeds using the compression status. If the compression status bit cache misses, then the miss triggers a fill operation from the backing store. After the fill completes, memory access proceeds using the newly filled compression status information.

20 Claims, 14 Drawing Sheets

EFFICIENT LINE AND PAGE ORGANIZATION FOR COMPRESSION STATUS BIT CACHING

CROSS-REFERENCE TO RELATED APPLICATIONS

This application claims priority benefit to United States provisional patent application titled, "Efficient Line and Page Organization for Compression Bit Caching," filed on Oct. 9, 2009 and having Ser. No. 61/250,431.

BACKGROUND OF THE INVENTION

1. Field of the Invention

Embodiments of the invention relate generally to memory systems and more specifically to an efficient line and page organization for compression status bit caching.

2. Description of the Related Art

Performance requirements are continually increasing in data processing systems, conventionally comprising one or more processor chips and attached memory devices organized as independently operating partitions. System performance is generally determined by on-chip data processing performance as well as effective bandwidth to the attached memory devices. One technique for increasing effective memory bandwidth, and therefore overall performance, is to store certain blocks of data within the attached memory in a compressed format. A plurality of both loss-less and lossy compression formats, as well as blocks not subject to any compression may coexist within attached memory. A compression status is associated with each block to specify whether the block of original data is stored uncompressed or using one of the plurality of compression formats. Each compression format advantageously reduces the number of bits needed to represent a block of original data stored in attached memory. A compression status bit set is associated with each block to encode the compression status for the block. Compression status bit sets for all compressible blocks may be stored as a compression status structure within attached memory. Sequential compression status bit sets within the compression status structure correspond to sequential blocks in the attached memory devices. Dedicated circuits coupled to a memory interface module typically perform compression and decompression operations based on compression status for a block being accessed. The memory interface module maps each physical address to one of one or more memory partitions to access a specified block of memory within the partition.

Another technique for increasing effective memory bandwidth is caching, whereby bandwidth demand is shifted from the attached memory devices to on-chip cache storage that provides low latency and high bandwidth access to data. Cache storage is typically organized as cache lines, with each complete cache line being filled or flushed in response to a respective read or write. A cache line is conventionally sized as an integral multiple of an access quantum to attached memory devices. A compression status bit cache is configured to store a plurality of compression status bit sets per cache line, thereby facilitating access to compression status bit sets for sequential physically addressed blocks in attached memory devices. Compression status stored by a given compression status bit set is used to determine compression format and therefore access size for a block of data prior to an access being initiated to the block of data.

Memory management of modern data processing systems typically implements a virtual memory access model for memory clients. Regions of contiguous virtual memory may be allocated and used by the memory clients, with access locality associated with virtual addresses. However, a contiguous range of virtual addresses may map arbitrarily to physical addresses. As such, an arbitrarily large number of compression status bit cache lines may be needed to store compression status bits associated with a given contiguous virtual address range. This can lead to cache fragmentation in the compression status bit cache and relatively inefficient use of associated cache storage, reducing overall efficiency for the processing system.

Accordingly, what is needed in the art is a technique for improving access efficiency for compression status bits in a virtual memory system.

SUMMARY OF THE INVENTION

One embodiment of the present invention sets forth a method for determining and updating compression status for a virtually addressed unit of data residing within a frame buffer. The method includes selecting a page table entry (PTE) based on a virtual address, the PTE comprising a physical address for the unit of data within the frame buffer and a compression cache tag line, computing a compression cache tag based on the compression cache tag line and a partition count for the frame buffer, and querying a compression cache to determine whether the compression cache tag represents a cache hit. If the compression cache tag represents a cache hit, then one or more compression bits are accessed from a cache line, wherein the one or more compression bits represent a compression status for the unit of data to be used when accessing the unit of data from the frame buffer. If the compression cache tag represents a cache miss, then the cache line is retrieved from memory prior to accessing the designated compression bits within the cache line.

One advantage of embodiments of the present invention is that a processing unit may efficiently access virtually mapped data that is compressed and distributed over an arbitrary number of partitions. Thus, embodiments of the present invention overcome prior art design deficiencies that limit the application of virtual memory mapping in systems having an arbitrary number of memory partitions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
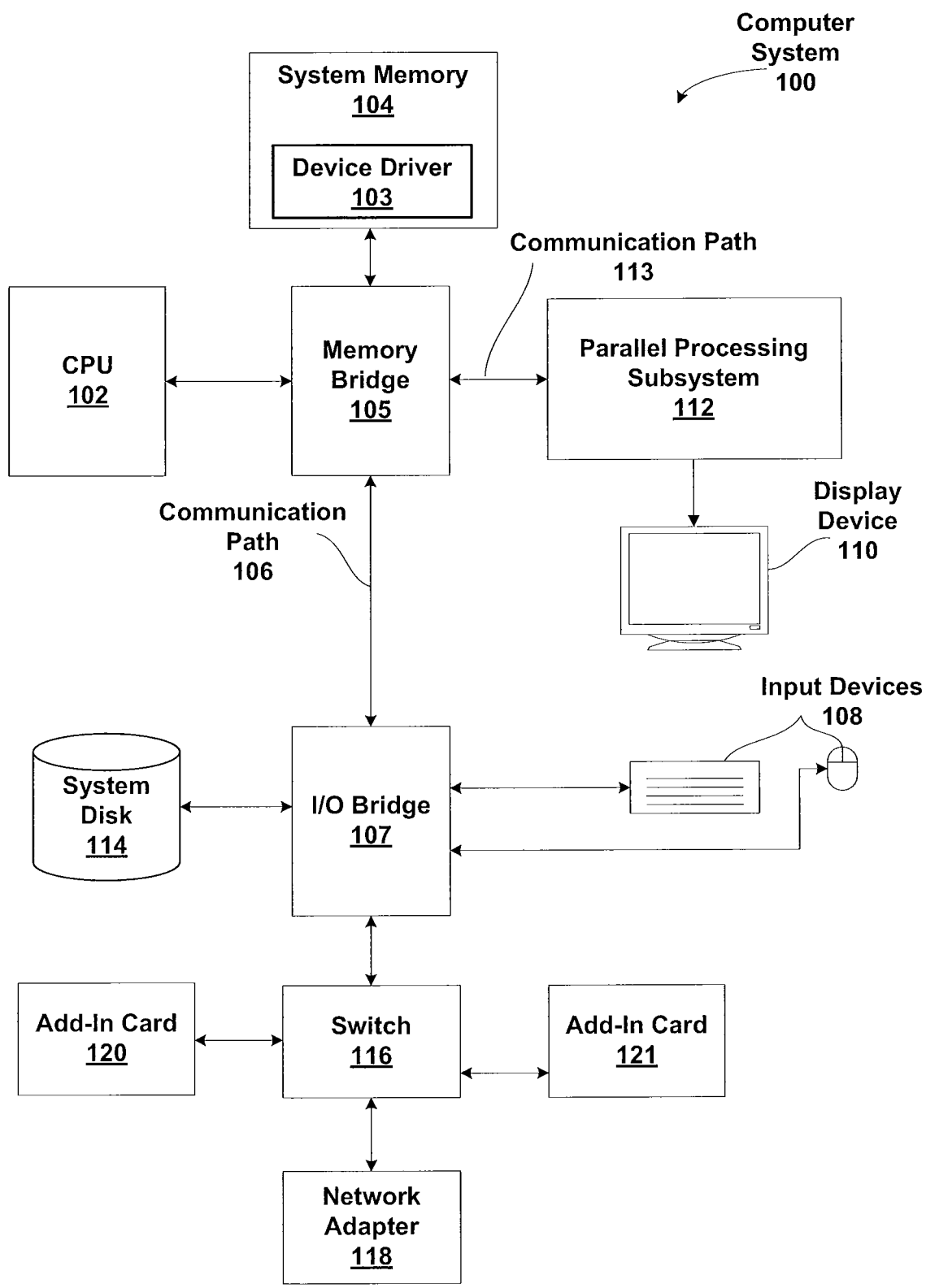
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
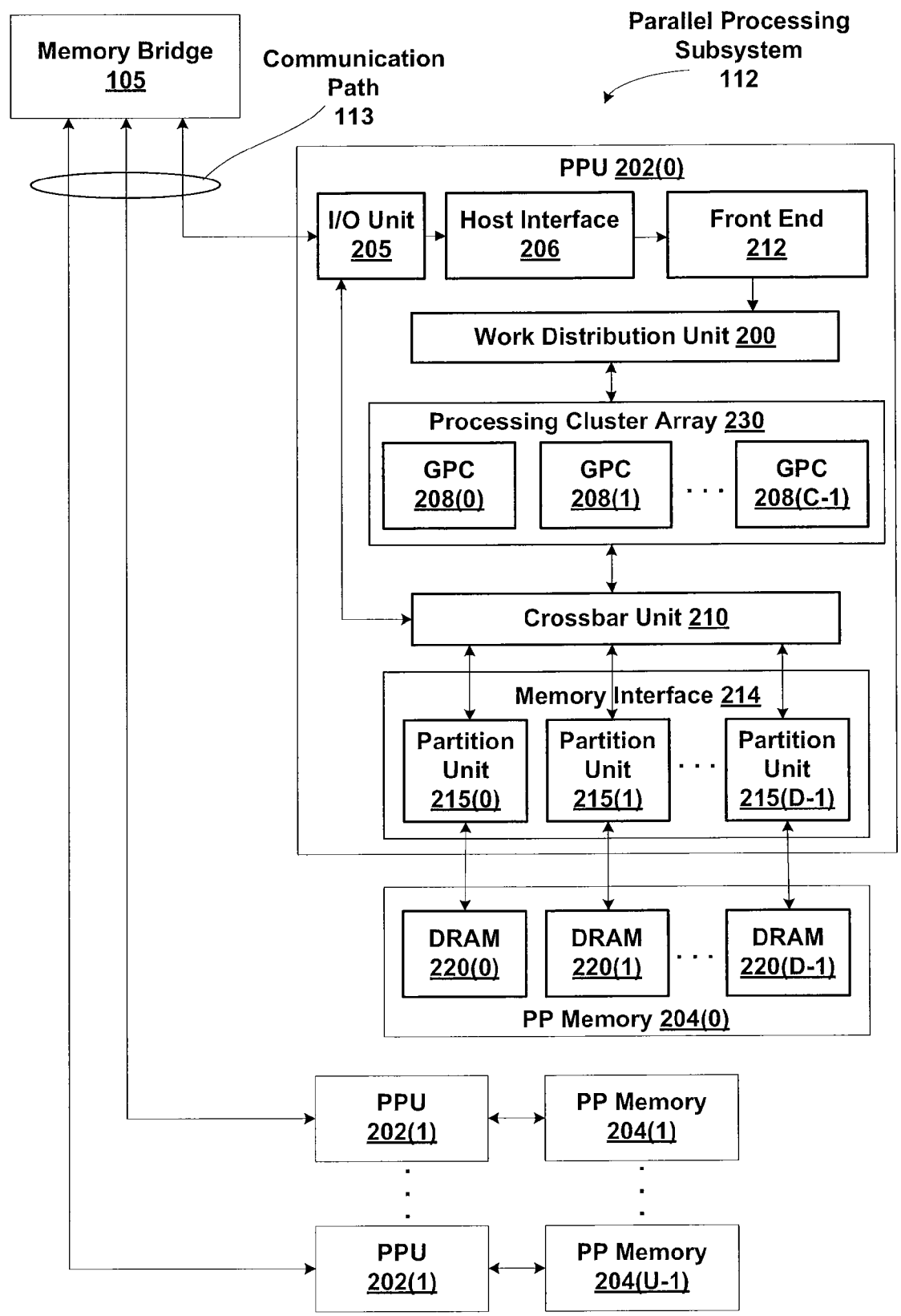
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
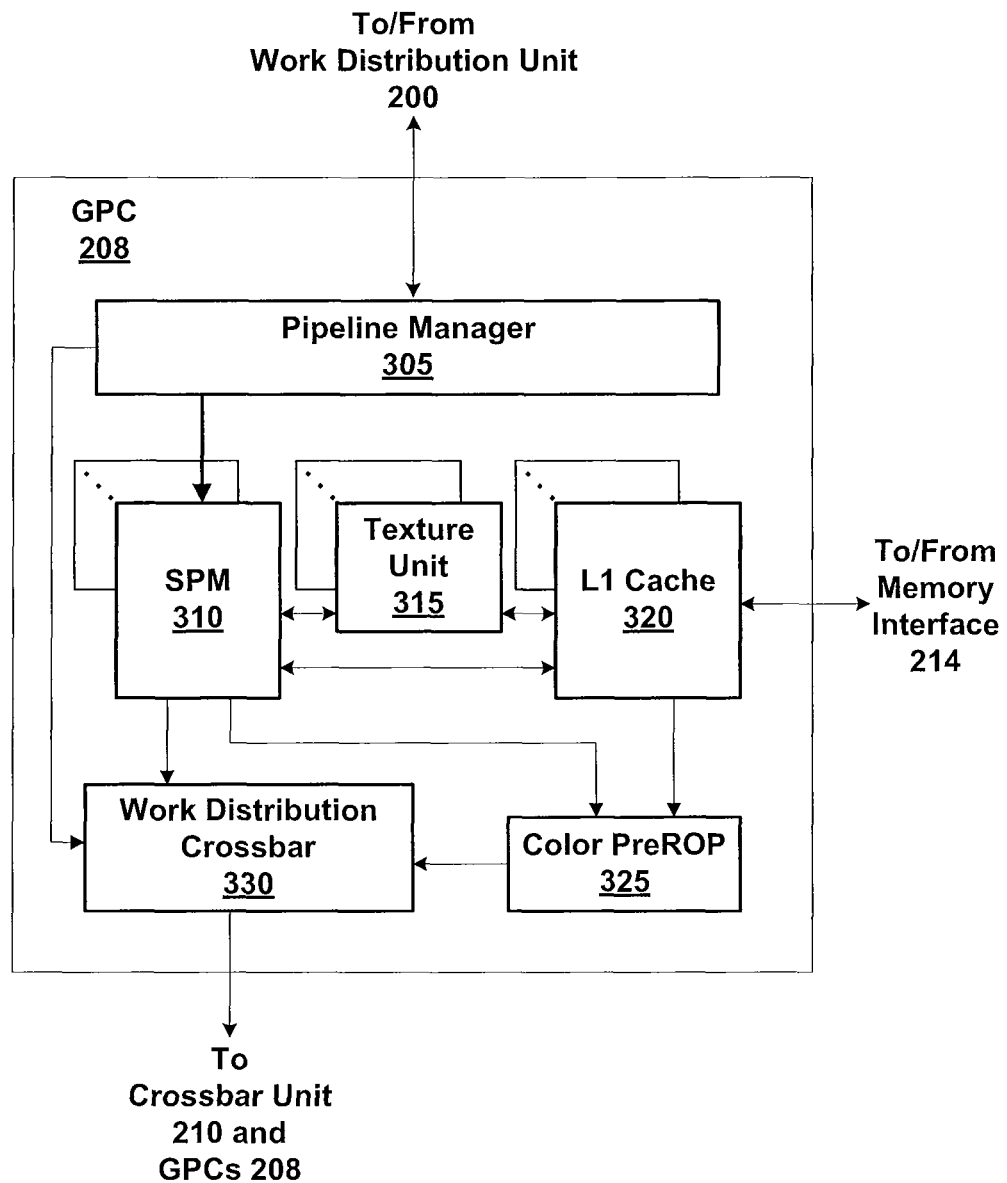
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
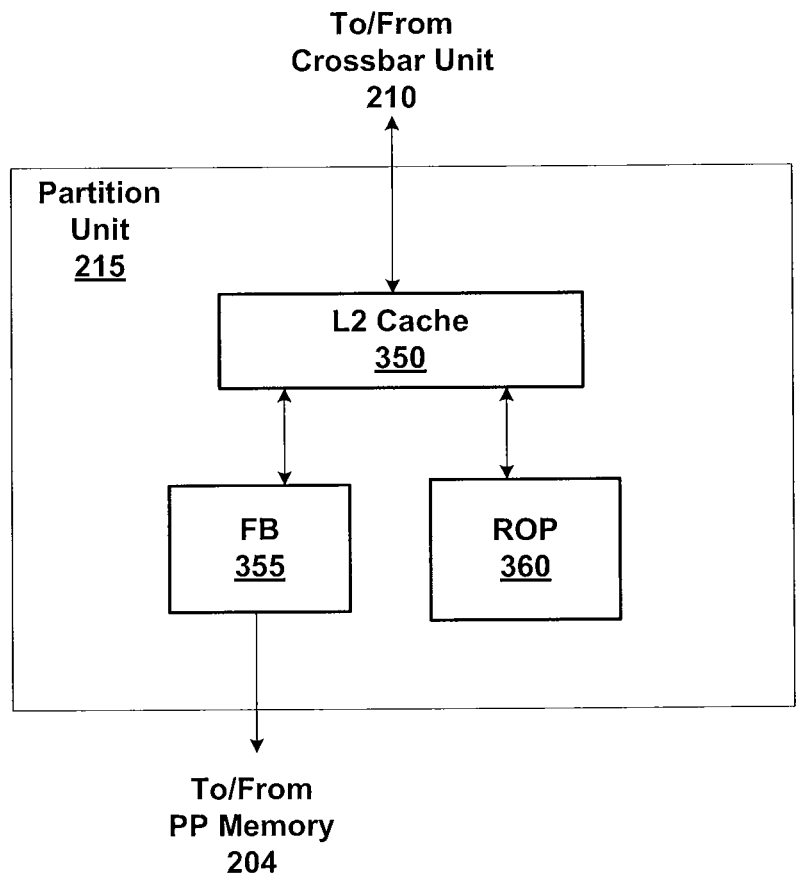
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB interface 355 for opportunistic processing. FB interface 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
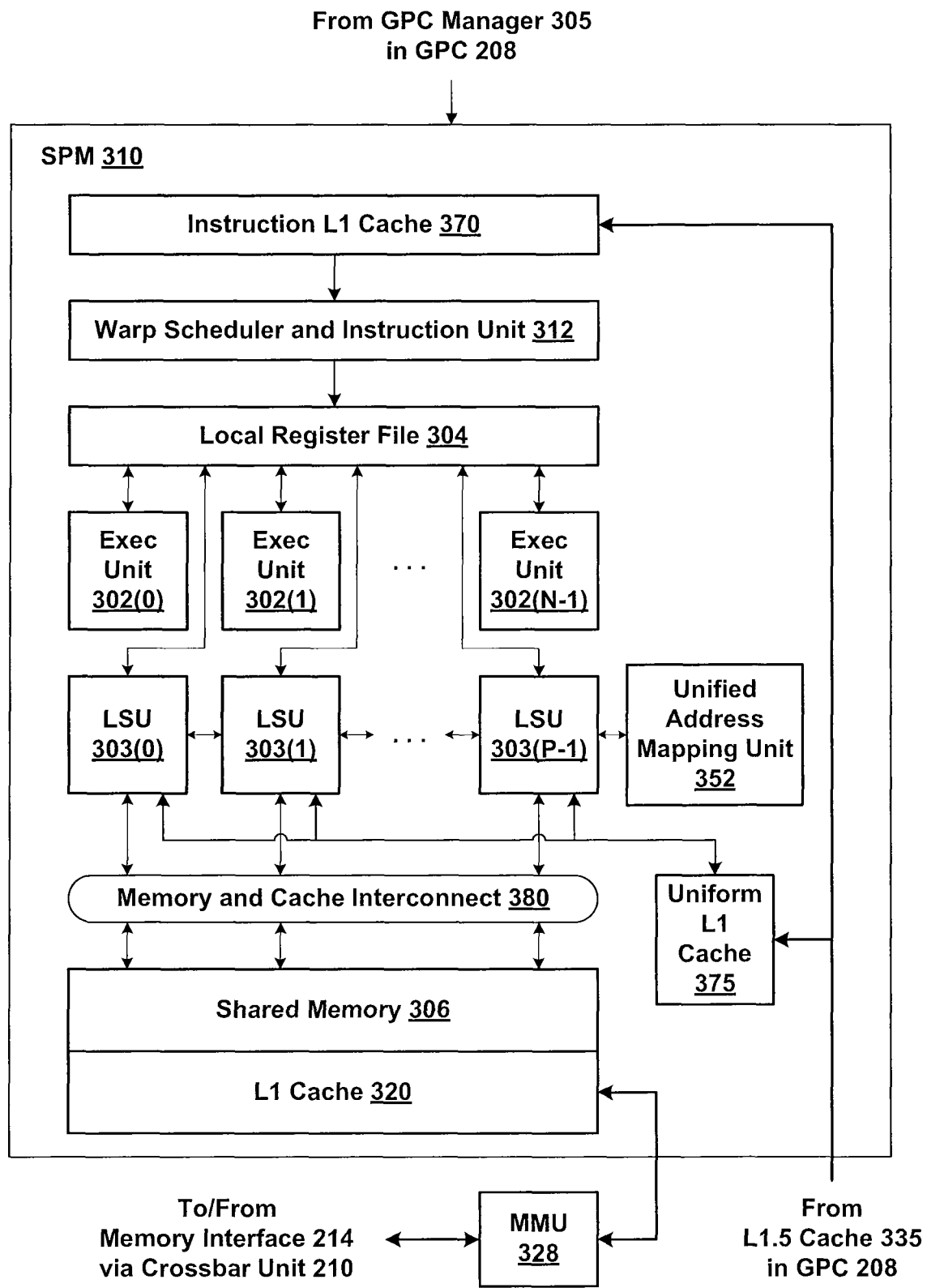
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 3D:
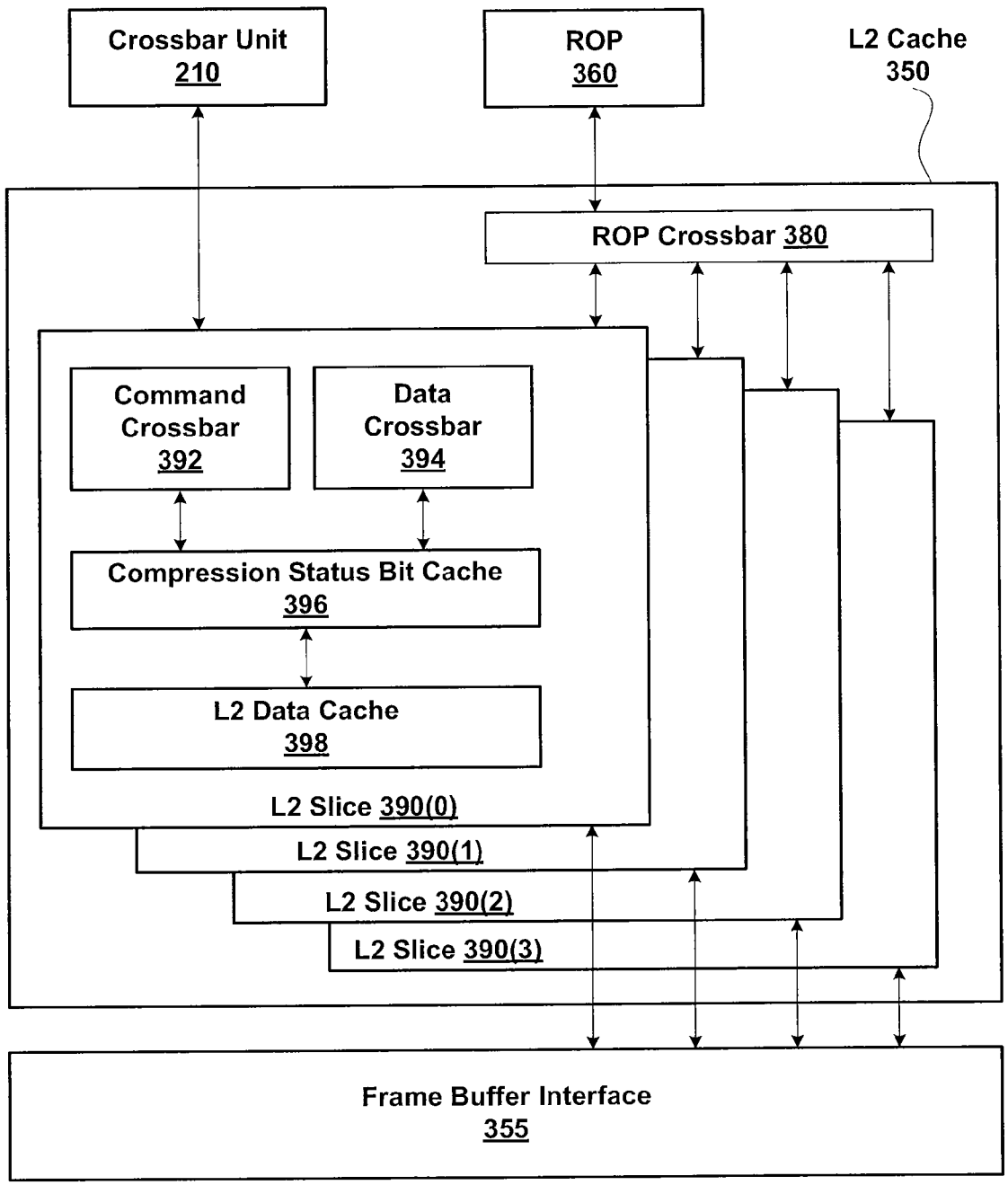
FIG. 3D is a conceptual diagram of the level two (L2) cache of FIG. 3B, according to one embodiment of the present invention.

FIG. 3D is a conceptual diagram of the level two (L2) cache 350 of FIG. 3B, according to one embodiment of the present invention. The L2 cache 350 comprises a ROP crossbar 380, and one or more L2 slices 390. In one embodiment, four L2 slices 390(0)-390(3) are included in the L2 cache 350. The L2 cache 350 receives memory access requests from a crossbar unit 210 and may receive memory access requests from at least one ROP 360. The memory access requests comprise read and write operations performed on memory blocks that may be associated with a data surface. The at least one ROP 360 presents memory access requests to the ROP crossbar 380, which distributes the requests to the L2 slices 390. In processing chips with two or more partition units, such as partition units 215 of FIG. 2, the crossbar unit 210 routes memory access requests to the two or more partition units, each including an instance of the L2 cache 350.

Each L2 slice 390 within each L2 cache 350 includes a command crossbar 392, a data crossbar 394, a compression status bit cache 396, and an L2 data cache 398. The command crossbar 392 directs a command portion of a memory access request to the compression status bit cache 396. The data crossbar 394 routes data between the compression status bit cache 396 and a memory client via the crossbar unit 210 or the ROP 360.

A backing store residing within an external DRAM, such as DRAM 220 of FIG. 2, comprises a data structure that should provide sufficient compression status bit sets to indicate compression status of all compressed memory blocks also residing in the DRAM. Each compression status bit set indicates compression status for a corresponding block of memory residing in external DRAM, which may be attached to the FB interface 355. The compression status bit cache 396 stores cache lines from the backing store, wherein each cache line includes a plurality of compression status bit sets. One or more cache lines are organized into a cache data store, disposed within the compression status bit cache 396. If a compression status bit set associated with a memory access request from a memory client is not currently stored in the cache data store, then a compression status bit cache miss is generated. In response to a compression status bit cache miss, the compression status bit cache 396 generates a memory access request to the backing store to retrieve a cache line that includes the requested compression status bit set.

In one embodiment, two bits comprise one compression status bit set, wherein each compression status bit set can assume one of four code values given by the two bits. One code value may be used to indicate that a corresponding block of memory is not compressed, while each of the remaining three code values may indicate one of three different compression formats.

The compression status bit cache 396 may implement any technically feasible tag association scheme and any technically feasible eviction policy. Under normal operation, a memory access request to a compressed surface will pass through the compression status bit cache 396 in order to determine compression status for the requested block of memory. Based on the compression status, a memory access request is forwarded to the L2 data cache 398 for processing. A cache hit in the L2 data cache 398 may be processed locally by the L2 data cache 398, while a cache miss in the L2 data cache 398 results in a memory access request being generated and posted to the FB interface 355. Any technically feasible replacement policy and association mechanism may be used within the L2 data cache 398.

Importantly, if the L2 data cache 398 misses, only the number of bits needed by a compressed representation of a corresponding cache line needs to be requested by the L2 data cache 398. The number of bits needed for a memory request initiated by the L2 data cache 398 is indicated by a compression status bit set residing within the compression status bit cache 396. By limiting a memory request size to include only bits needed by a compressed representation of a requested block of memory, bandwidth demands on PP memory 204 are reduced.

Certain memory clients, such as ROP 360, are compression aware and are able to directly read and write compressed data. Other clients are compression naïve and are not able to process compressed data directly. For example, the GPCs 208 of FIG. 2 are generally not equipped to process compressed data. If a compression aware memory client requests a read or write operation to a compressed block of memory, the L2 cache 350 may reply with compressed data. If, however, a compression naïve memory client requests a read from a compressed block of memory, the L2 cache 350 decompresses data within the compressed block of memory and returns decompressed data to the naïve memory client. In certain instances, a compression naïve memory client may only write uncompressed data back to any given block of memory.

Graphics Pipeline Architecture

Figure 4:
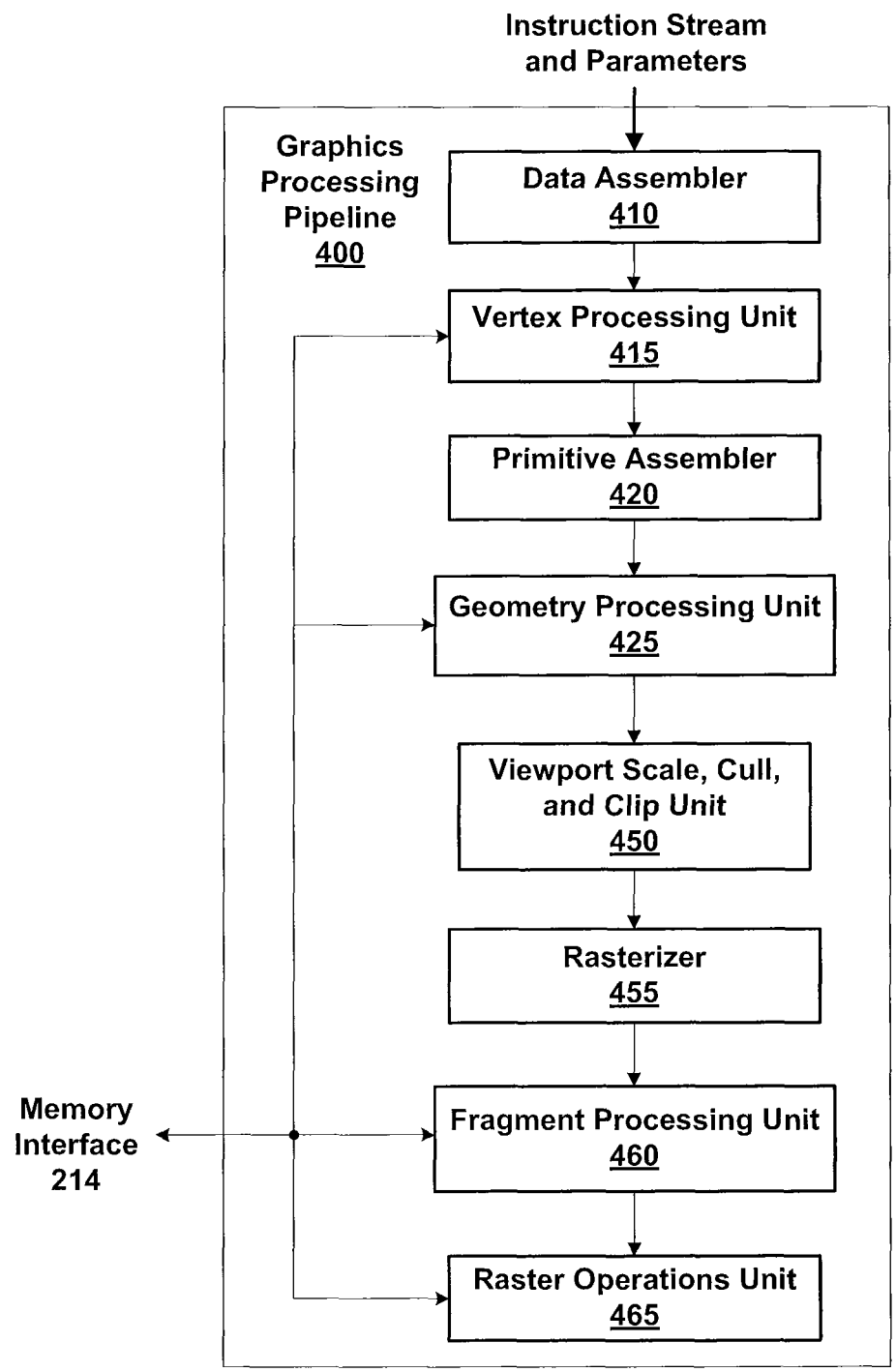
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Compression Status Bit Cache and Backing Store

Figure 5:
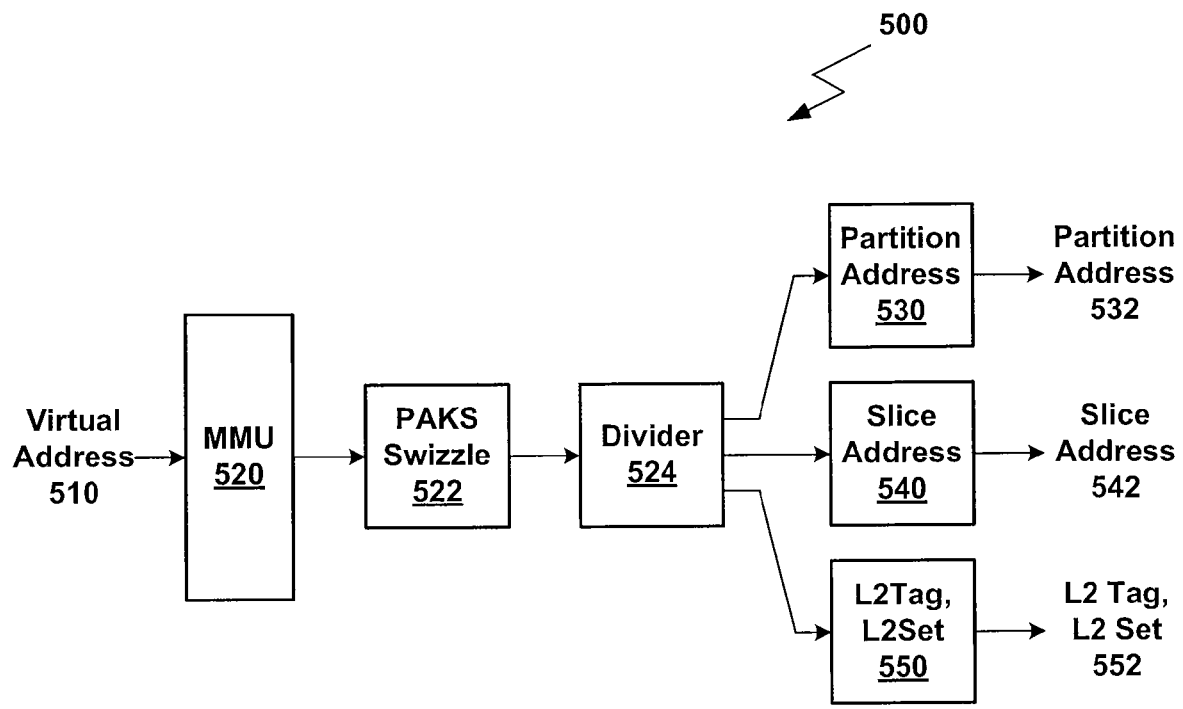
FIG. 5 is a conceptual diagram of a virtual address to raw partition address conversion pipeline, according to one embodiment of the present invention.

FIG. 5 is a conceptual diagram of a virtual address to raw partition address conversion pipeline 500, according to one embodiment of the present invention. The virtual address to raw partition address conversion pipeline 500 includes a memory management unit (MMU) 520, a physical address kind swap swizzle unit (PAKS swizzle) 522, a divider 524, a partition address unit 530, a slice address unit 540, and a L2 tag, L2 set unit 550. In one embodiment, each GPU 208 of FIG. 2 includes an MMU unit.

The MMU 520 includes a set of page table entries (PTEs) used to map a virtual address 510 to a physical address. Each PTE includes, without limitation, virtual address to physical address mapping information, surface kind information, and compression tag line information. The physical address is processed by the PAKS swizzle 522 to generate a swizzled physical address that distributes access locality to allow efficient request interleaving among partition units. The divider generates a quotient and remainder used by the partition address unit 530, the slice address unit 540, and the L2 tag, L2 set unit 550 to compute a unique DRAM address. The partition address unit 530 computes a partition address 532 that is used to route a corresponding memory access request to one partition unit 215 of FIG. 2. The slice address unit 540 computes a slice address 542 that is used to route the memory access request to one selected L2 slice 390 of FIG. 3D.

The L2 tag, L2 set unit 550 receives a slice-specific physical address comprising a quotient from divider 524 and an offset address for the memory access request. The L2 tag, L2 set unit 550 computes an L2 tag and L2 set 552, corresponding to a raw partition address that may be used to access a specific DRAM 220 device. The L2 tag and L2 set 552 may also be used to query the L2 data cache 398 of FIG. 3D.

Figure 6:
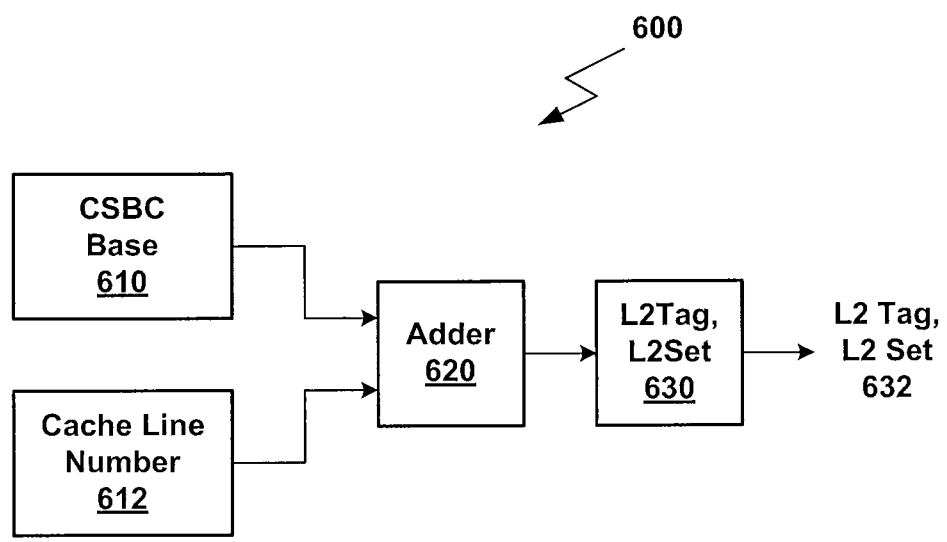
FIG. 6 is a conceptual diagram of a raw partition address generation pipeline for a compression status bit cache, according to one embodiment of the present invention.

FIG. 6 is a conceptual diagram of a raw partition address generation pipeline 600 for a compression status bit cache, according to one embodiment of the present invention. A compression status bit cache (CSBC) base 610 comprises an offset address for the backing store of FIG. 3D used to store compression status bits. A cache line number 612 is arithmetically added to the CSBC base 610 by adder 620 to compute a slice-specific physical address that may be processed by an L2 tag, L2 set unit 630 to generate an L2 tag, L2 set address 632 corresponding to a raw partition address that may be used to access a specific DRAM 220 device. The L2 tag, L2 set unit 630 performs substantially identical computation on the slice-specific physical address versus the L2 tag, L2 set unit 550 of FIG. 5. Importantly, both the L2 tag, L2 set unit 630 and L2 tag, L2 set unit 550 receive slice-specific physical addresses of identical form and perform substantially identical address bit manipulation on the slice-specific physical addresses to generate raw partition addresses of identical form. This symmetry allows both units to address blocks of data within the same partition without address space collisions. In one embodiment, the raw partition address generation pipeline 600 is implemented within the compression status bit cache 396 of FIG. 3D.

The cache line number 612 is derived from the compression tag line information generated by the MMU 520. The cache line number 612 associates a block of compressed memory to a set of associated compression status bits. The cache line number 612 also serves as a lookup tag used by the compression status bit cache 396 of FIG. 3D.

Figure 7:
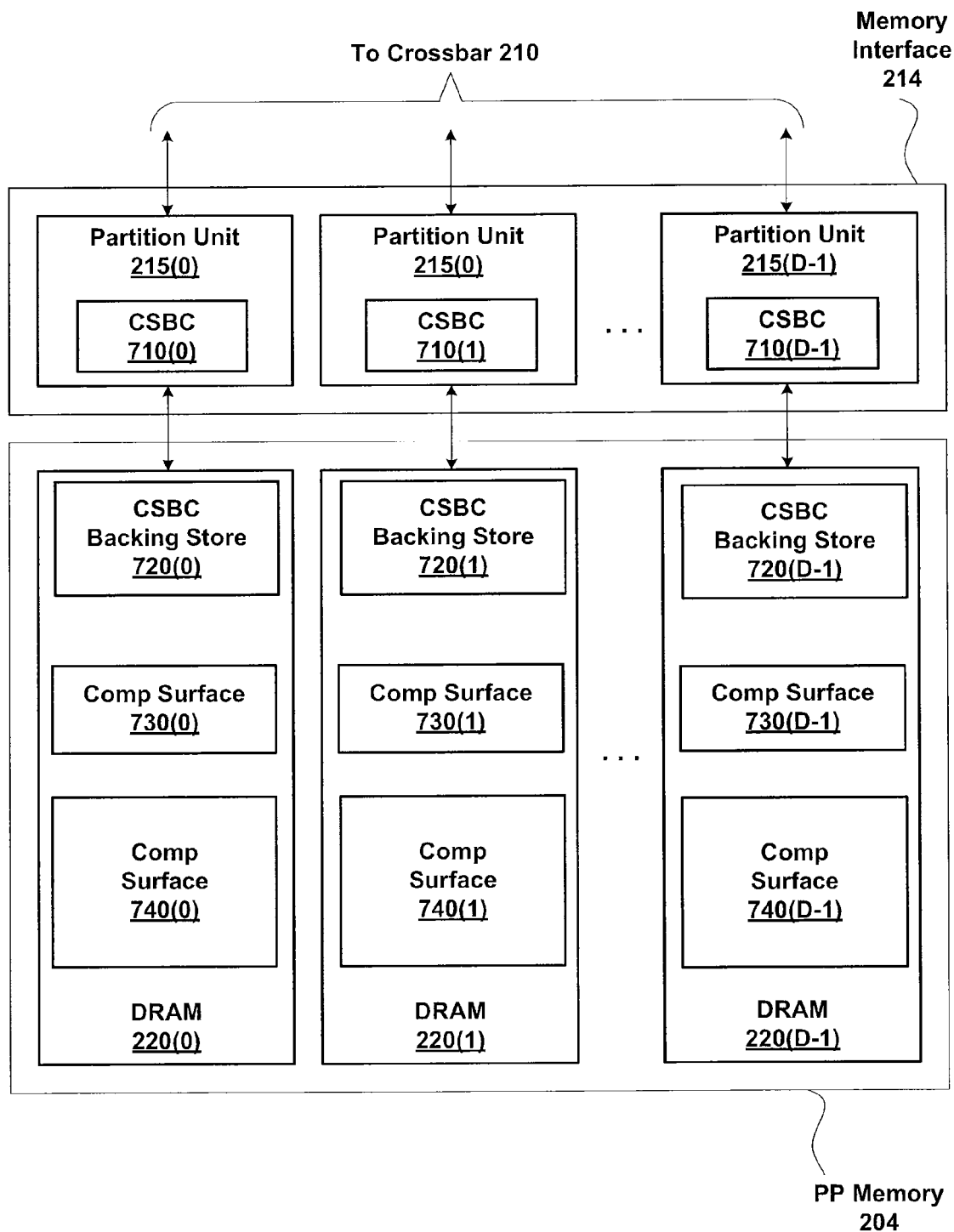
FIG. 7 illustrates a surface mapping unevenly onto a set of partitions, according to one embodiment of the present invention.

FIG. 7 illustrates allocation of compression status bit cache backing stores 720 relative to partition association with attached parallel processor memory 204. Each partition unit 215 includes a compression status bit cache (CSBC) 710 configured to provide an on-chip, cached version of compression status bits residing in a corresponding CSBC backing store 720. In one embodiment, CSBC 710 comprises plural instances of compression status bit cache 396 of FIG. 3D, where each instance is associated with an L2 slice 390.

Each CSBC backing store 720 is configured to store compression status bits that should map exclusively to blocks of data residing in the corresponding DRAM 220. For example, CSBC backing store 720(1) includes compression status bits that map exclusively to DRAM 220(1). Additionally, CSBC 710(1) caches compression status bits that map exclusively to CSBC backing store 720(1). By contrast, compressed surfaces 730 and 740 include data that is distributed over DRAM 220(0) through DRAM 220(D-1), within PP memory 204.

Persons skilled in the art will understand that by confining which DRAM 220 stores compression status bits for blocks of data residing in the same DRAM 220, significant additional traffic over crossbar 210 may be averted, while preserving enhanced memory performance gained by distributing normal memory access requests over multiple partitions.

Efficient Organization for Compression Status Bit Caching

Embodiments of the present invention set forth a memory subsystem, such as memory interface 214 of FIG. 2, configured to include a cache that is indirectly virtual address-mapped. The memory subsystem can store certain data in a compressed format to save memory bandwidth. Instead of sending the virtual address together with the physical address to the memory subsystem, each page table entry (PTE) residing in MMU 328 of FIG. 3C stores a compression tag line label (comptagline) that maps a specific physical page to a compression status bit cache line. The width of the label can be significantly shorter than the full virtual address width because not all virtual memory may be compressible and some bits below the page granularity can be recovered from the physical address.

Figure 8:
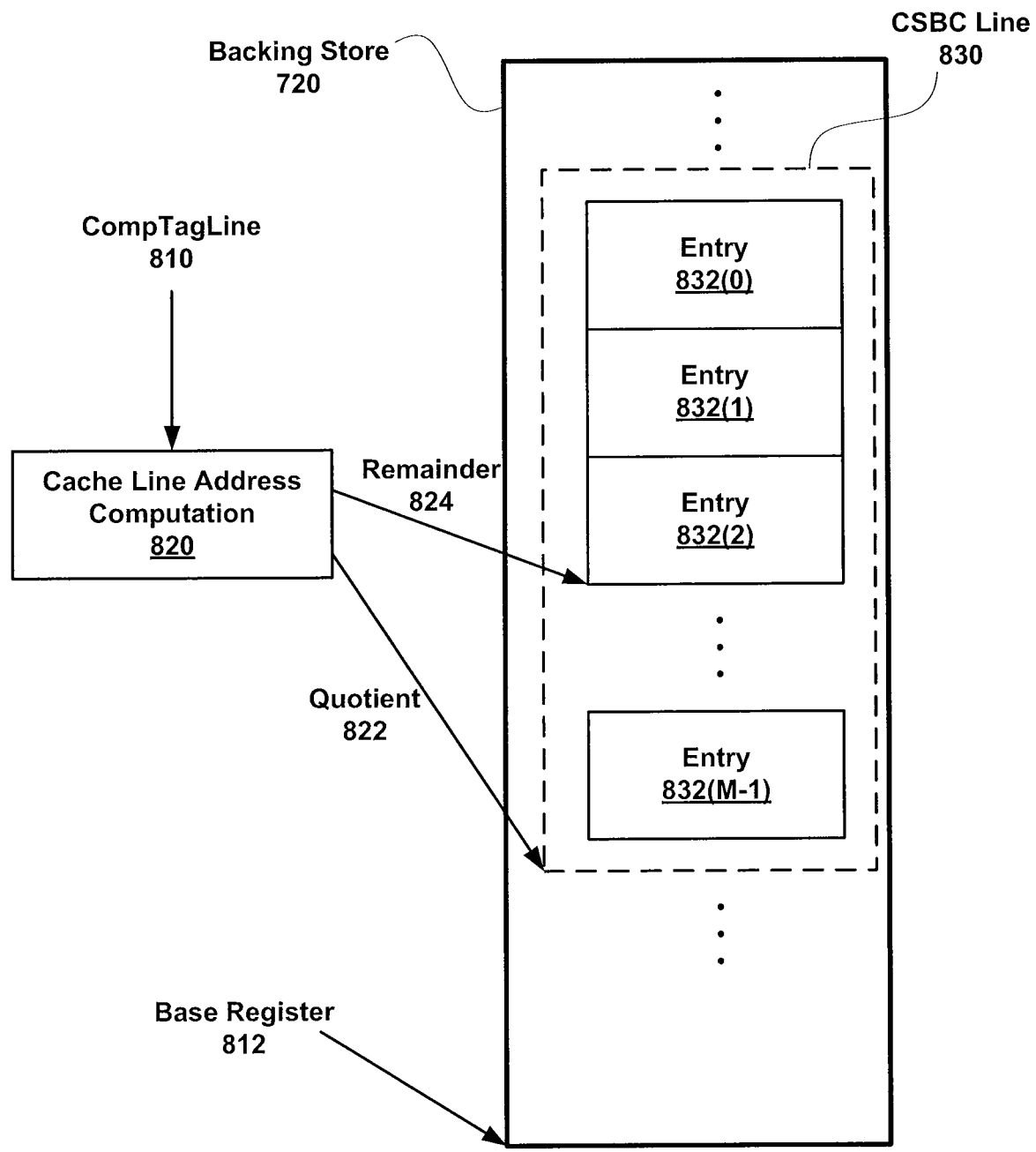
FIG. 8 illustrates compression status bit entries within a compression status bit backing store, according to one embodiment of the present invention.

FIG. 8 illustrates compression status bit entries 832 within compression status bit backing store 720, according to one embodiment of the present invention. Base register 812 specifies a starting address for the compression status bit cache backing store 720 within a partition of DRAM 220. The base register 812 contains a post-divide two kilo-byte (KB) aligned address. The entries 832 map to a compression status bit cache (CSBC) line 830, which is stored within the CSBC 396 of FIG. 3D. The CSBC 396 includes plural CSBC lines 830 stored in local (on chip) random access memory (RAM). Each compression bit cache 396 computes a per slice local physical address for each cache line by adding an offset to the base register 812. The offset corresponds to quotient 822 computed from the comptagline 810 stored in an associated PTE. A particular entry 832 is selected from a remainder value 824. A division operation is performed in a cache line address computation 820 that generates the quotient 822 and remainder 824. The division operation divides the value of the comptagline 810 by a number of comptaglines per cache line. The number of comptaglines per cache line depends on the number of L2 slices.

CSBCs 710 of FIG. 7, each comprising plural instances of compression status bit cache 396, store compression status bit data that represents the compression status of corresponding data residing within DRAMs 220. This data is typically contiguous in a virtual address space, but may not be physically contiguous due to memory paging. For good locality and to avoid the compression status bit cache 710 from being fragmented, cache lines 830 within the compression status bit cache 710 should correspond to the compression status of virtually contiguous data. However, the memory system operates only on physical address.

Because contiguous virtual pages may store related data, a plurality of contiguous compression tag line labels can map to the same compression bit cache line within the compression status bit cache 710. The compression status bit cache lines 830 should be large enough to generate efficient accesses to memory and to reduce the compression status bit cache tag lookup overhead. The number of physical page labels that map to a compression status bit cache line 830 is adjusted based on the number of active memory partitions in the system to keep the size of the cache line 830 constant. Each compression status bit cache 710 is local to each partition to minimize latency and traffic between partitions. Each compression status bit cache line 830 resides in internal cache random access memory (RAM) and is organized into multiple sectors, where each sector corresponds to an integral number of physical page labels. Each compression tag line label maps to a single entry 832. The internal cache RAM is organized so that each sector forms a RAM word. This organization ensures that each sector can be efficiently accessed in a single cycle.

Each RAM word may store compression status bit information for an integral number of pages, including additional bits that may be used as padding. As illustrated below, use of padding depends on the number of active partitions in the system. Pages that are unevenly distributed across multiple partitions (e.g. due to non-power of two number of partitions in the system) are accommodated by allowing some number of bits in each cache line 830 to go unused in certain configurations.

One embodiment comprises eight partitions with four L2 slices 390 each, for a total of 32 independent compression status bit caches 396. Each L2 slice 390 also has an L2 data cache 398 in addition to the compression status bit cache 396. Each compression status bit cache 396 has on-chip storage for sixteen 512 byte cache lines 830 (for a total of 8 Kilo-bytes). The compression status bit cache lines are fully associative with respect to comptagline 810 tags. The compression status bit cache lines 830 fill and evict in whole units of 512 bytes. Evictions write through the L2 data cache 398. Fill requests that miss in the L2 data cache 398 are returned directly from DRAMs 220 via FB interface 355 to the compression status bit cache 396 without allocating lines in the L2 data cache 398. This policy avoids a deadlock if no space is available in the L2 data cache 398. Fill requests that hit in the L2 data cache 398 are returned from the L2 data cache 398 without issuing a read request to FB interface 355. A fill request for a 512 byte (512B) compression status bit line may partially hit and partially miss in the L2 data cache 398, resulting in a request to the FB interface 355.

In the above embodiment, the compression status bit backing store 720 can hold up to 16 MB of compression bit data. This corresponds to 32768 cache lines. Each cache line belongs to one compression bit cache slice and the backing store address mapping guarantees that the whole 512B compression bit line falls within the address range cached by the L2 data cache of the same slice. Another embodiment, for example, comprises six partitions with two L2 slices 390 each, for a total of twelve independent compression status bit caches 396. Each L2 slice 390 also has an L2 data cache 398 in addition to the compression status bit cache 396. Each compression status bit cache 396 has on-chip storage for fifty-four 1024 byte cache lines 830 (for a total of 648 Kilo-bytes).

The MMU 328 maintains a PTE for each virtual memory page. In addition to a physical address, the PTE stores the comptagline 810 and a "kind" field. The kind field defines the format of data stored in the associated page and determines if and what type of compression the page supports. The comptagline 810 tells the compression status bit cache 396 where the compression status bits of the page are located within a corresponding data store for the compression status bit cache 396. Each comptagline 810 uniquely identifies a CSBC entry 832 within the CSBC 830 line. The CSBC entry 832 comprises the compression status bits for an associated 128 KB page. There is a 1:1 mapping between 128 KB pages and comptaglines. If multiple virtual pages share the same comptagline, they must also share the same physical address.

A PTE may map different sizes of virtual pages. For example, a page could be 4 KB or 128 KB. In one embodiment only 128 KB pages permit compression page kinds. In an alternative embodiment, 4 KB through 128 KB pages permit compression, whereby the same comptagline is considered in combination with additional bits of a page virtual address. For example 4 KB pages can be accommodated by considering the same comptagline and five bits of each virtual address for a page.

A 128 KB page spreads constituent data and corresponding compression bits across all partitions and all L2 slices 390. The number of 256B compressible tiles from a page that falls within an L2 slice varies depending on the number of total partitions (and number of L2 slices within a partition). The Table 1, below, illustrates the number of 256B tiles from a 128 KB comptagline that fall within an L2 slice. The maximum number is adjusted to account for all block linear kinds and two 64 KB pages programmed with the same 128 KB comptagline.

TABLE 1

| Number of Partitions | Maximum Number of 256 B Tiles per Slice | Minimum Number of 256 B Tiles per Slice |
| --- | --- | --- |
| 1 | 128 | 128 |
| 2 | 64 | 64 |
| 3 | 44 | 40 |
| 4 | 32 | 32 |
| 5 | 28 | 24 |
| 6 | 24 | 20 |
| 7 | 24 | 16 |
| 8 | 16 | 16 |

For non-power of two partitions, the number of tiles that fall within a slice will vary. This is accommodated by padding the compression bit backing store such that all slices can store compression bits corresponding to the maximum number of tiles per slice. This leads to some number of unused (wasted) bits being cached by the compression status bit cache.

Zero bandwidth clears (ZBC) associate a compression bit encoding with a programmable value from a table. A ZBC enables setting a whole 256B tile to a constant (clear) value by only updating corresponding compression status bits. When applicable, this technique provides a compression ratio of 1020:1 and results in a significant bandwidth reduction. To support ZBC, each L2 slice 390 stores a four-bit index in addition to the compression status bits for one 128 KB page, two 64 KB pages or thirty-two 4 KB pages. The ZBC index can only be changed after first verifying that no tile within the page within the slice is referencing the ZBC index. In a preferred embodiment, checking for ZBC index usage is performed in a single clock cycle.

Given the above parameters, a compromise between compression bit cache data store RAM width requirements and minimizing unused cache compression bits for various partition configurations results in a 276-bit wide compression status bit RAM for use within the compression status bit cache 396. Table 2, below, shows the number of pages per entry in the data store RAM and the percentage of unused compression status bits for supported partition configurations. Two versions of padding are implemented for the seven-0partition scenario: one for 128 KB VM pages and one for 64 KB pages. The smaller 64 KB pages require additional padding and are generally not very efficient. A special-case packing scheme is implemented for the seven-partition scenario to reduce general inefficiency.

TABLE 2

| Number of Partitions | Pages per Data Store RAM Entry | Bits per Page | Percentage of Unused Bits |
| --- | --- | --- | --- |
| 1 | 1 | 260 | 5.80% |
| 2 | 2 | 132 | 4.35% |
| 3 | 3 | 92 | 0.00% |
| 4 | 4 | 68 | 1.45% |
| 5 | 4 | 60 | 13.04% |
| 6 | 5 | 52 | 5.80% |
| 7 (64 KB) | 5 | 52 | 5.80% |
| 7 (128 KB) | 6 | 44 | 4.54% |
| 8 | 7 | 36 | 8.70% |

TABLE 2-continued

| Number of Partitions | Pages per Data Store RAM Entry | Bits per Page | Percentage of Unused Bits |
|---|---|---|---|

In one embodiment, for each tile associated with each page, the compression status bit cache 396 stores four ZBC index bits and two compression status bits. A start index of a page within the 256B data store RAM entry is always nibble (four-bit) aligned. In one embodiment, the seven-partition, 64 KB configuration uses the same start index values as the six-partition configuration to minimize associated selection circuitry. The start index indicates where, within the cache line, a particular entry resides.

Table 3, below, lists a start index for compression status bits and ZBC index bits associated with pages within each data store RAM entry. A start index locates an entry 832, comprising compression status bits and ZBC index bits, within one cache line 830. In one embodiment, the start index indicates where the first bit of the ZBC index bits resides within the data store RAM for a corresponding page.

TABLE 3

| Number of Partitions | Pg 0 | Pg 1 | Pg 2 | Pg 3 | Pg 4 | Pg 5 | Pg 6 |
|---|---|---|---|---|---|---|---|
| 1 | 0 | — | — | — | — | — | — |
| 2 | 0 | 132 | — | — | — | — | — |
| 3 | 0 | 92 | 184 | — | — | — | — |
| 4 | 0 | 68 | 136 | 204 | — | — | — |
| 5 | 0 | 60 | 120 | 180 | — | — | — |
| 6 | 0 | 52 | 104 | 156 | 208 | — | — |
| 7 | 0 | 44 | 88 | 132 | 176 | 220 | — |
| 8 | 0 | 36 | 72 | 108 | 144 | 180 | 216 |

Each 512B compression bit cache line 830 maps to fourteen 276 bit RAM words. This mapping adds an additional 5.66% of unused bits: 14*276=3864, 512*8=4096. The RAM is organized in two 31B wide banks to support 32B granular fills and evicts and 34.5B granular accesses. Each 512B cache line 830 uses 8 entries from bank 0 and 8 entries from bank 1. The 7 first entries from bank 0 together with 3.5 bytes each from the last entry of bank 1 form 7 276b entries. Similarly, the last 7 entries from bank 1, each together with 3.5 bytes of the last entry from bank 0 for a second set of 7 276b entries. The 6.5 most significant bytes of the two top entries from each bank are unused. This organization is illustrated below in table 4.

TABLE 4

| 512 B Cache Line | 34.5 B Entry | Mapping of Bank to Entry BankN[Index]MSB:LSB |
|---|---|---|
| 0 | 0 | {Bank1[7]19:0, Bank0[0]255:0} |
| 0 | 1 | {Bank1[7]39:20, Bank0[1]255:0} |
| ... | ... | ... |
| 0 | 6 | {Bank1[7]139:120, Bank0[6]255:0} |
| 0 | 7 | {Bank0[7]19:0, Bank1[0]255:0} |
| ... | ... | ... |
| 0 | 12 | {Bank0[7]119:100, Bank1[5]255:0} |
| 0 | 13 | {Bank0[7]139:120, Bank1[6]255:0} |

For fills and evicts, the banks are addressed directly, where the RAM address is equivalent to the LSBs of the backing store 720 address and bit 3 of the backing store 720 address select the bank. Bank0 is mapped to the first 8×32B of each 512B cache line 830 and bank1 is mapped to the last 8×32B. The upper byte of the 32B evict/fill data path is not connected to a bank, but is written as zero on eviction. For fills and evicts, any unused backing store bit is set to zero.

The cache line 830 number, cache line entry 832, and page index within the entry are computed from the comptagline 810. The cache line 830 is the comptagline 810 divided by the number of comptaglines per cache line. The remainder divided by the number of comptaglines per entry is the entry. The remainder is the page index within the entry.

Cache line=comptagline/comptaglines_per_cache_line
Entry=comptagline % 14;
Index=(comptagline % comptaglines_per_cache_line)/14

Comptaglines_per_entry is equal to pages per entry from table 2. To get comptagline_per_cache line, multiply comptaglines_per_entry by 14. In one embodiment, the divide by fourteen is implemented as binary shifts and adds followed by a correction factor from a table lookup to yield an exact result. The width of comptagline is 17 bits, but this bit width may be adjusted to accommodate a specific implementation.

Each 256B tile has two associated compression bits. The location of the compression bits within the comptagline 810 is computed from the tile's physical address. The physical address received by L2 has redundant information, such as slice and partition identification number removed. The physical address is made up of two components: the L2 tag and the L2 index (i.e. the set index). This local address is mapped to a compression bit pair by taking the 256B-aligned portion (512B aligned for 64-bit depth kind) of the address modulo the maximum number of compression bits per page per slice. Depending on a particular partition configuration, different modulo operators needed to compute the location of the compression bits within a 128 KB page are given below in Table 5:

TABLE 5

| Number of Partitions | Modulo Operator | RTL Implementation |
|---|---|---|
| 1 | 128 | Power of two |
| 2 | 64 | Power of two |
| 3 | 44 | Mod 11 << 2 |
| 4 | 32 | Power of two |
| 5 | 28 | Mod 7 << 2 |
| 6 | 24 | Mod 6 << 2 |
| 7 | 20 | Mod 5 << 2 |
| 8 | 16 | Power of two |

For 64 KB pages, one bit less can be extracted from the physical address. The lost bit is replaced by an additional virtual address bit piped between MMU and L2. Modulo operators are adjusted for the smaller 64 KB footprint as shown below in table 6. Note that the same modulo operators can be used with a one-bit shift.

TABLE 6

| Num Partitions | Modulo operator | RTL Implementation |
|---|---|---|
| 1 | 64 | Power of two |
| 2 | 32 | Power of two |
| 3 | 22 | Mod 11 << 1 |
| 4 | 16 | Power of two |
| 5 | 14 | Mod 7 << 1 |
| 6 | 12 | Mod 6 << 1 |
| 7 | 12 | Mod 6 << 1 |
| 8 | 8 | Power of two |

In one embodiment, 4 KB pages are only supported for one and two partition configurations. To support 4 KB pages, SW assigns the same comptagline 810 to up to 32 virtually contiguous pages and 5 additional virtual address bits are piped from MMU 328 to L2 cache 350 to compensate for bits that are unavailable via the physical address.

TABLE 7

| Num Partitions | Modulo operator | RTL Implementation |
| --- | --- | --- |
| 1 | 4 | Power of two |
| 2 | 2 | Power of two |

In alternative embodiments, larger CSBCs are supported by reducing the number of cache lines while keeping the overall compression footprint constant. Such embodiments can easily support growing the cache line size by a power of two. Tag matching logic and the number of bytes read on a CSBC miss and written on eviction need to be appropriately modified according to well known logic design principles. However, such embodiments may be implemented according to the cache line data structure described herein.

Figure 9:
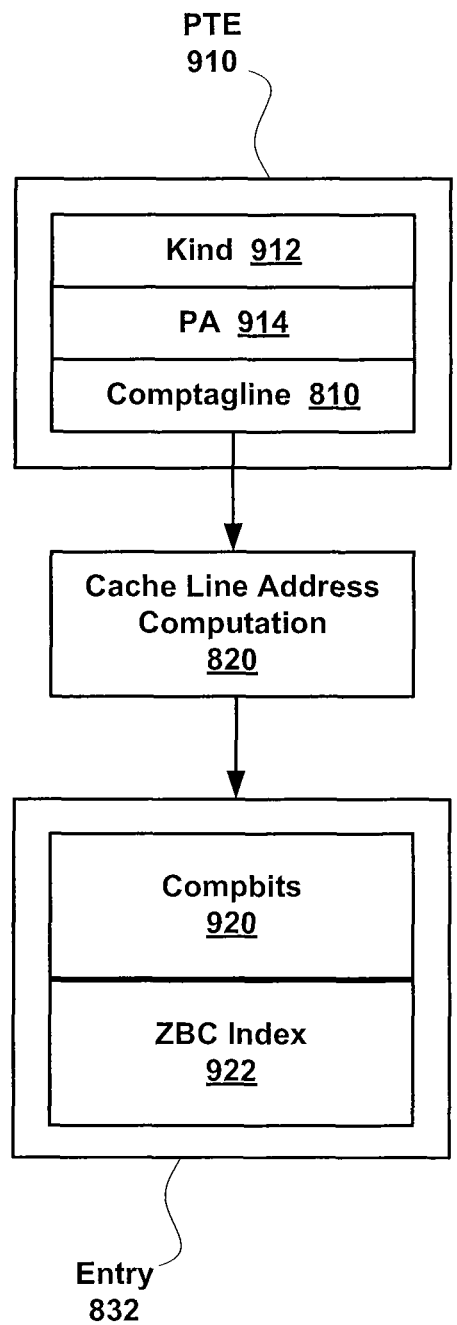
FIG. 9 illustrates a page table entry configured to store a reference to a compression status bit entry for a corresponding physical block, according to one embodiment of the present invention.

FIG. 9 illustrates a PTE 910 configured to store a reference to a compression status bit entry 830 for a corresponding physical block, according to one embodiment of the present invention. The MMU 328 of FIG. 3C receives a virtual address and selects PTE 910 based on mapping from the virtual address to physical address (PA) 914, stored within PTE 910. The PTE 910 also includes a kind field 912 configured to indicate which one of a plurality of kinds of data is stored in an associated page of physical memory. The comptagline 810 is used in an associative lookup by the CSBC 396 to determine whether cache line 830 is resident within the CSBC 396. As described previously, the comptagline 810 is also used to address a CSBC entry 832. Each CSBC entry 832 resides within a CSBC line 830 and comprises compression status bits 920 and ZBC index bits 922. Compression status bits 920 determine the size of a corresponding memory access transaction to a given partition. ZBC index bits 922 are an index that selects a constant value for an associated surface.

Figure 10A:
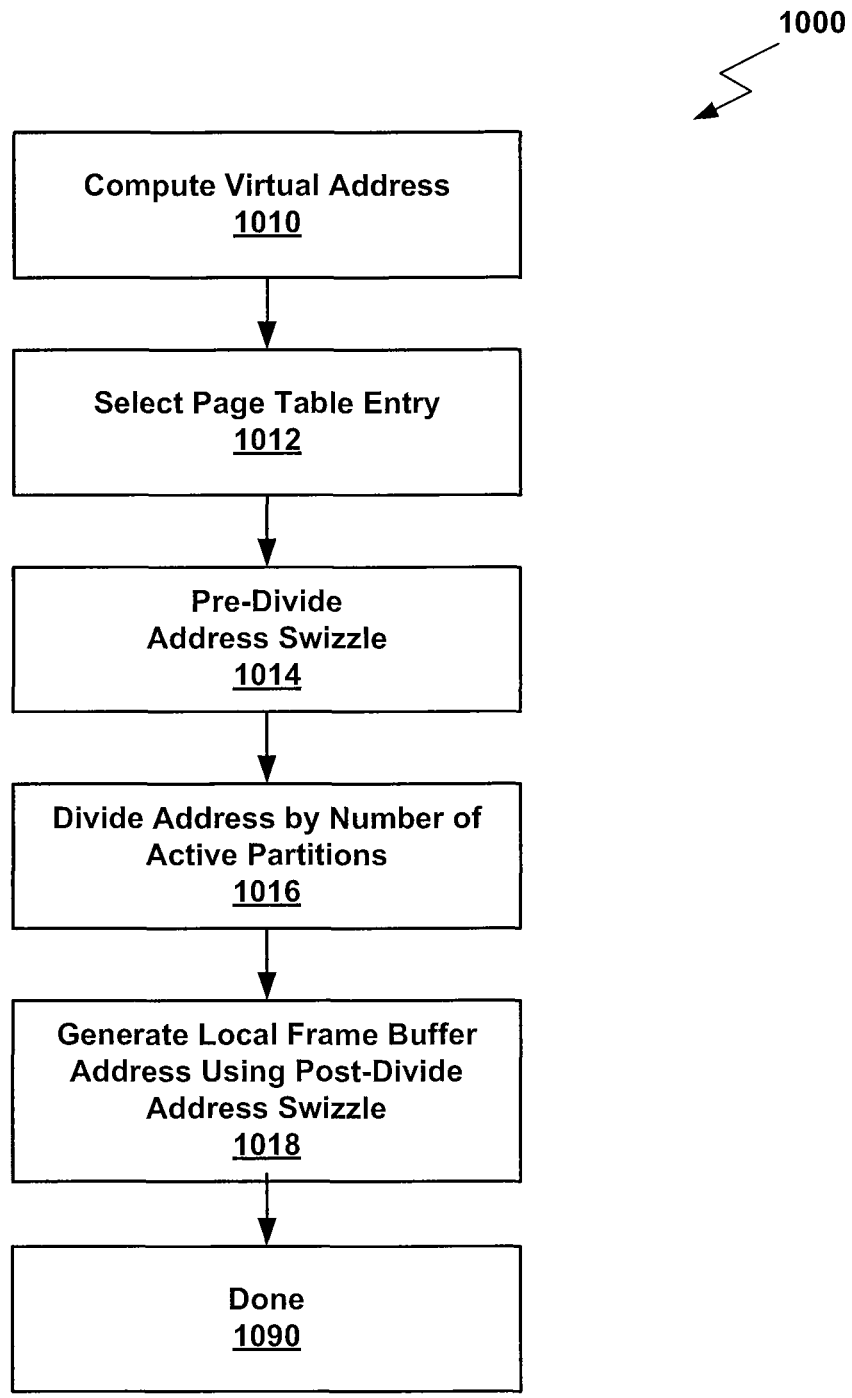
FIG. 10A is a flow diagram of method steps for mapping a virtual address to a local frame buffer address, according to one embodiment of the present invention.

FIG. 10A is a flow diagram of method steps 1000 for mapping a virtual address to a local frame buffer address, according to one embodiment of the present invention. Although the method steps 1002 are described in conjunction with the systems of FIGS. 1-7, persons skilled in the art will understand that any system configured to perform the method steps, in any order, is within the scope of the inventions.

The method begins in step 1010, where a GPC 208 of FIG. 2 computes a virtual address that represents a client memory access request. For a two-dimensional graphics surface, the virtual address is computed from a two-dimensional surface coordinate. For a generic memory page, the virtual address corresponds to an address computed by the GPC 208. In step 1012, the MMU 328 performs a page table look up to select a particular PTE 910 corresponding to the virtual address. Importantly, the PTE 910 includes a kind field 912, comptagline field 810, and physical address (PA) field 914 for the virtual address. The comptagline field 810 is a unique label that associates data in DRAM 220 that is mapped by the PTE with compression status bits in a corresponding CSBC 396 that track compression status for the data. After step 1012 is complete, PTE 910 is selected. A corresponding kind field 912 and comptagline field 810 are then available from the PTE 910.

In step 1014, the partition address conversion pipeline 500 of FIG. 5 performs a pre-divide address bit swizzle. This step distributes memory transaction workload over partitions units 215 comprising the memory interface 214. In step 1016, the divider 514 within the partition address conversion pipeline 500 divides pre-divide address bit swizzle results by a number of active partitions. In step 1018, the partition address conversion pipeline 500 performs a post divide swizzle to yield a local frame buffer address comprising a partition number, an L2 slice number, and an L2 slice physical address (padr). The padr represents a local address for use by the L2 cache 350 to access attached DRAM 220 via the frame buffer interface 355. The method terminates in step 1090.

Figure 10B:
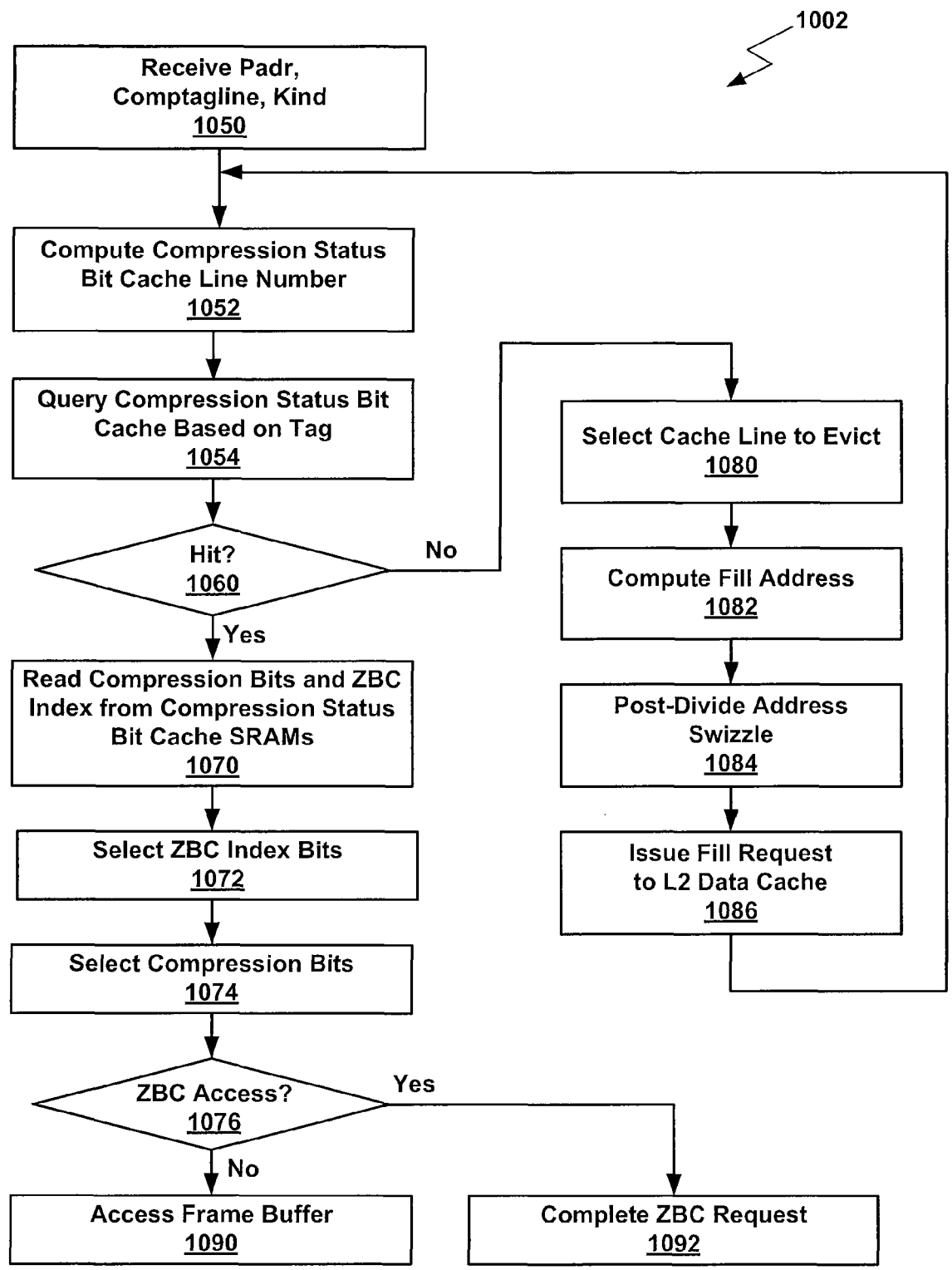
FIG. 10B is a flow diagram of method steps for accessing compressed data within the frame buffer based on the local frame buffer address and compression status bit information, according to one embodiment of the present invention.

FIG. 10B is a flow diagram of method steps 1002 for accessing compressed data within the frame buffer based on the local frame buffer address and compression status bit information, according to one embodiment of the present invention. Although the method steps 1002 are described in conjunction with the systems of FIGS. 1-7, persons skilled in the art will understand that any system configured to perform the method steps, in any order, is within the scope of the inventions. The method steps 1002 continue method steps 1000 to complete a memory access to DRAM 220 by a partition unit 215. Persons skilled in the art will understand that a memory access, as referred to herein, may constitute either a read operation or a write operation.

The method begins in step 1050, where the CSBC 396 receives an L2 slice physical address (padr), comptagline, and kind for a client memory access request. In step 1052, the CSBC 396 computes a cache tag for lookup, based on the comptagline and number of active partitions. In step 1054, the CSBC 396 performs a query based on the computed cache tag. In one embodiment, the query is a fully associative lookup relative to tags for currently resident cache lines. Any technically feasible technique may be used to perform the associative lookup. For example, a content addressable memory structure may be configured to perform the associative lookup.

If, in step 1060, the associative lookup yields a hit, then the method proceeds to step 1070. In step 1070, the CSBC 396 reads compression status bits and ZBC bits from the CSBC data store RAM. An address for the corresponding location within the CSBC data store RAM is computed using the associative lookup results in combination with the comptagline information stored within the respective PTE. In step 1072, the CSBC 396 selects one four-bit ZBC index stored per comptagline slice. The one four-bit ZBC index is selected from a plurality of four-bit ZBC indices stored within a cache line 830. In step 1074, the CSBC 396 selects one set of compression bits stored per comptagline slice. The one set of compression bits is selected from a plurality of compression bit sets stored within cache line 830.

If, in step 1076, the memory access request is not a ZBC access request, then the method proceeds to step 1090, where the CSBC 396 posts an access request to the frame buffer interface 355 corresponding to the original client memory access request received in step 1050. The method terminates in step 1090.

Returning to step 1076, if the memory access request is a ZBC request, then the method proceeds to step 1092, where the CSBC 396 completes the ZBC request. If the ZBC request is a write request, the CSBC 396 determines whether the corresponding ZBC index for the write request matches the ZBC index for the associated client memory access. If the write access request matches the ZBC index for the client memory access, then the write is complete with no further action. If the ZBC index for the write access request does not match the ZBC index for the client memory access and the ZBC index is not in use by another memory page, then the ZBC write proceeds. The method terminates in step 1092.

Returning to step 1060, if the associative lookup yields a miss, then the method proceeds to step 1080, where the CSBC 396 selects a CSBC line 830 for eviction. Any technically feasible eviction policy may be implemented without departing from the scope of the present invention. In one embodiment, the eviction policy is based on a least recently used (LRU) policy. Unused cache lines are assigned highest priority for eviction, while a non-dirty least recently used cache line has second highest priority. Dirty cache lines must be written out before being evicted and may introduce additional eviction latency. In step 1082, the CSBC 396 computes a fill address for a required cache line 810 residing in backing store 720. In step 1084, the CSBC 396 performs a post-divide address swizzle, as described previously in FIG. 5, to generate a local partition address. In step 1086, the CSBC issues a fill request via the L2 cache 398. If the miss is to a previously evicted CSBC line, then the line may still reside in the L2 cache 398. If the requested CSBC line is still resident within the L2 cache 398, then the L2 cache 398 may be able to fill the fill request without needing to post a request to PP memory 204. After the requested CSBC line is filled, the method proceeds to step 1052.

In sum, a technique is disclosed for storing compression status of memory pages that are virtually mapped in a memory system comprising an arbitrary number of partitions. The compression status specifies a form of compression, if any, applied to each tile within a given memory page. A virtual address is mapped to a linear physical address via a page table structure using any technically feasible mapping technique. Each PTE is configured to store compression attributes in addition to the linear physical address. The linear physical address is transformed to an L2 partition address using divide and swizzle operations that provide statistical spreading over an arbitrary number of available partitions. The L2 partition address, in combination with the compression attributes, is used to perform an associative query to a compression status bit cache. In a hit scenario, a compression status bit cache entry is retrieved. The entry indicates compression status used for accessing an associated tile. In a miss scenario, a compression status bit cache line fill request is posted to an attached L2 cache. After the fill operation completes, the corresponding compression status bit cache entry is queried to determine a compression status for a requested portion of memory. Once compression status for a portion of memory is available, an access request is posted to frame buffer memory to access the portion of memory.

One advantage of embodiments of the present invention is that a processing unit may efficiently access virtually mapped data that is compressed and distributed over an arbitrary number of partitions. Thus, embodiments of the present invention overcome prior art design deficiencies that limit the application of virtual memory mapping in systems having an arbitrary number of memory partitions. Embodiments of the present invention also improves compression status caching in such systems, enabling an overall memory system that efficiently combines virtual memory mapping and compression while preserving the option of utilizing an arbitrary number of partitions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for determining and updating compression status for a virtually addressed unit of data residing within a frame buffer, the method comprising:
   selecting a page table entry (PTE) based on a virtual address, the PTE comprising a physical address for the unit of data within the frame buffer and a compression cache tag line;
   computing a compression cache tag based on the compression cache tag line and a number of active partitions in the frame buffer;
   querying a compression cache to determine whether the compression cache tag represents a cache hit; and
   if the compression cache tag represents a cache hit, then accessing one or more compression bits from a cache line, wherein the one or more compression bits represent a compression status for the unit of data to be used when accessing the unit of data from the frame buffer, or
   if the compression cache tag represents a cache miss, then retrieving one or more compression bits for storage in an identified cache line.

2. The method of claim 1, wherein the step of accessing one or more compression bits comprises:
   identifying a corresponding cache line based on the cache tag; and
   selecting based on the number of active partitions the one or more compression bits from a plurality of bits included within the cache line.

3. The method of claim 2, wherein the step of querying comprises performing a fully associative lookup operation of the compression cache tag based on a plurality of resident compression cache tags.

4. The method of claim 1, where the step of retrieving comprises:
   computing a local frame buffer address based on the cache tag; and
   issuing a fill request to a data cache based on the local frame buffer address.

5. The method of claim 1, wherein the compression cache tag represents a cache hit, and further comprising the step of accessing the frame buffer based on a local frame buffer address and the compression status of the unit of data.

6. The method of claim 1, wherein the step of accessing further comprises reading or writing zero bandwidth clear (ZBC) bits from a cache line corresponding to the cache hit.

7. The method of claim 1, wherein the compression cache tag represents a cache hit, and further comprising the steps of determining that the unit of data is represented by a zero bandwidth clear (ZBC) index, and accessing the unit of data.

8. A processing subsystem, comprising:
   a frame buffer that includes a plurality of memory devices organized as partitions, wherein each partition has a number of active partitions; and a processing unit coupled to the frame buffer and including:
    a processing cluster configured to generate a virtual address corresponding to a unit of data residing in the frame buffer, and
    a memory interface coupled to the processing cluster and to the frame buffer and configured to:
        select a page table entry (PTE) based on the virtual address, the PTE comprising a physical address for the unit of data within the frame buffer and a compression cache tag line,
        compute a compression cache tag based on the compression cache tag line and the number of active partitions for the frame buffer,
        query a compression cache to determine whether the compression cache tag represents a cache hit, and
        if the compression cache tag represents a cache hit, then access one or more compression bits from a cache line, wherein the one or more compression bits represent a compression status for the unit of data to be used when accessing the unit of data from the frame buffer, or
        if the compression cache tag represents a cache miss, then retrieve one or more compression bits for storage in an identified cache line.

9. The processing subsystem of claim 8, wherein, to access one or more compression bits, the memory interface is further configured to:
    identify a corresponding cache line based on the cache tag; and
    select based on the number of active partitions the one or more compression bits from a plurality of bits included within the cache line.

10. The processing subsystem of claim 9, wherein, to query, the memory interface is configured to perform a fully associative lookup operation of the compression cache tag based on a plurality of resident compression cache tags.

11. The processing subsystem of claim 8, wherein, to retrieve, the memory interface is configured to:
    compute a local frame buffer address based on the cache tag; and
    issue a fill request to a data cache based on the local frame buffer address.

12. The processing subsystem of claim 8, wherein the compression cache tag represents a cache hit, and the memory interface is further configured to access the frame buffer based on a local frame buffer address and the compression status of the unit of data.

13. The processing subsystem of claim 8, wherein, to access, the memory interface is further configured to access zero bandwidth clear (ZBC) bits from a cache line corresponding to the cache hit.

14. The processing subsystem of claim 8, wherein the compression cache tag represents a cache hit, and the memory interface is further configured to determine that the unit of data is represented by a zero bandwidth clear (ZBC) index, and to access the unit of data.

15. A computer system, comprising:
    a system memory; and
    a processing subsystem, comprising:
        a frame buffer that includes a plurality of memory devices organized as partitions, wherein each partition has a number of active partitions, and
        a processing unit coupled to the frame buffer and including:
            a processing cluster configured to generate a virtual address corresponding to a unit of data residing in the frame buffer, and
            a memory interface coupled to the processing cluster and to the frame buffer and configured to:
                select a page table entry (PTE) based on the virtual address, the PTE comprising a physical address for the unit of data within the frame buffer and a compression cache tag line,
                compute a compression cache tag based on the compression cache tag line and the number of active partitions for the frame buffer,
                query a compression cache to determine whether the compression cache tag represents a cache hit, and
                if the compression cache tag represents a cache hit, then access one or more compression bits from a cache line, wherein the one or more compression bits represent a compression status for the unit of data to be used when accessing the unit of data from the frame buffer, or
                if the compression cache tag represents a cache miss, then retrieve one or more compression bits for storage in an identified cache line.

16. The computer system of claim 15, wherein, to access one or more compression bits, the memory interface is further configured to:
    identify a corresponding cache line based on the cache tag; and
    select based on the number of active partitions the one or more compression bits from a plurality of bits included within the cache line.

17. The computer system of claim 16, wherein, to query, the memory interface is configured to perform a fully associative lookup operation of the compression cache tag based on a plurality of resident compression cache tags.

18. The computer system of claim 15, wherein, to retrieve, the memory interface is configured to:
    compute a local frame buffer address based on the cache tag; and
    issue a fill request to a data cache based on the local frame buffer address.

19. The computer system of claim 15, wherein the compression cache tag represents a cache hit, and the memory interface is further configured to access the frame buffer based on a local frame buffer address and the compression status of the unit of data.

20. The computer system of claim 15, wherein, to access, the memory interface is further configured to read or write zero bandwidth clear (ZBC) bits from a cache line corresponding to the cache hit and to determine that the unit of data is represented by a zero bandwidth clear (ZBC) index, and to access the unit of data.

* * * * *